United States Patent [19]

Cooper

[11] Patent Number: 4,573,070
[45] Date of Patent: Feb. 25, 1986

[54] NOISE REDUCTION SYSTEM FOR VIDEO SIGNALS

[76] Inventor: J. Carl Cooper, 1373 Sydney Dr., Sunnyvale, Calif. 94087

[21] Appl. No.: 615,666

[22] Filed: May 31, 1984

Related U.S. Application Data

[63] Continuation of Ser. No. 268,870, Jun. 1, 1981, abandoned, which is a continuation-in-part of Ser. No. 30,288, Apr. 16, 1979, Pat. No. 4,305,091, which is a continuation-in-part of Ser. No. 763,904, Jan. 31, 1977, abandoned.

[51] Int. Cl.⁴ .............................................. H04N 9/64
[52] U.S. Cl. .................................... 358/36; 358/167; 358/37; 358/166
[58] Field of Search ................. 358/167, 166, 162, 36, 358/37, 163, 170, 160, 213; 364/515; 382/50, 51, 54

[56] References Cited

U.S. PATENT DOCUMENTS

| | | | |
|---|---|---|---|
| 3,424,987 | 1/1969 | Fluhr | 328/127 |
| 4,050,084 | 9/1977 | Rossi | 358/31 |
| 4,058,836 | 11/1977 | Drewery | 358/167 |
| 4,064,530 | 12/1977 | Kaiser | 358/36 |
| 4,072,984 | 2/1978 | Kaiser | 358/31 |
| 4,090,221 | 5/1978 | Connor | 358/166 |
| 4,107,736 | 8/1978 | Lowry | 358/36 |
| 4,107,739 | 8/1978 | Rossi | 358/167 |
| 4,194,219 | 3/1980 | Drewery | 358/167 |

FOREIGN PATENT DOCUMENTS 2236334 2/1974 Fed. Rep. of Germany .

OTHER PUBLICATIONS

Improved Signal Processing Techniques for Color Television Broadcasting, by R. H. McMann, Jr. and A. A. Goldberg—Mar. 1968, Journal of SMPTE, vol. 77.
Digital Television Image Enhancement, by John P. Rossi—Jul. 1975, Journal of the SMPTE, vol. 84.
A Digital Noise Reducer for Encoded NTSC Signals, by R. H. McMann, S. Kreinik, J. K. Moore, A. Kaiser and J. Rossi—1977, Digital Video.
Comb Filter Improvement with Spurious Chroma Deletion, by Arthur Kaiser, Jan. 1977, SMPTE Journal, vol. 86, No. 1.
Theoretical Improvement in Signal to Noise Ratio of Television Signals by Equivalent Comb Filter Technique, by Murray J. Stateman and Murray B. Ritterman of Sylvania Electric Products, Inc.
Recent Advances in the Synthesis of Comb Filters, by Warren D. White and A. E. Ruvin of Airborne Instruments Laboratory, Inc.

Primary Examiner—Michael A. Masinick
Attorney, Agent, or Firm—Woodling, Krost, Rust & Hochberg

[57] ABSTRACT

Noise reduction on a video signal is achieved by an adaptive filter system which is capable of automatic changes in filter parameters. This inventive concept includes an automatic method of independently changing both the width and center frequency of the teeth of a comb type bandpass envelope of the filter, as well as adjusting the amplitude response of the filter, independent of the bandpass characteristics, in order to closely match the filter bandpass response to the power spectrum of the video signal being processed, thus rejecting noise in those portions of the spectrum not being used by the video signal. The filter system herein disclosed also provides an adaptive spatial processing of the video signal thus further improving said signal by enhancing detail in the image and by smoothing low amplitude noise in relatively detail free areas of the picture.

43 Claims, 16 Drawing Figures

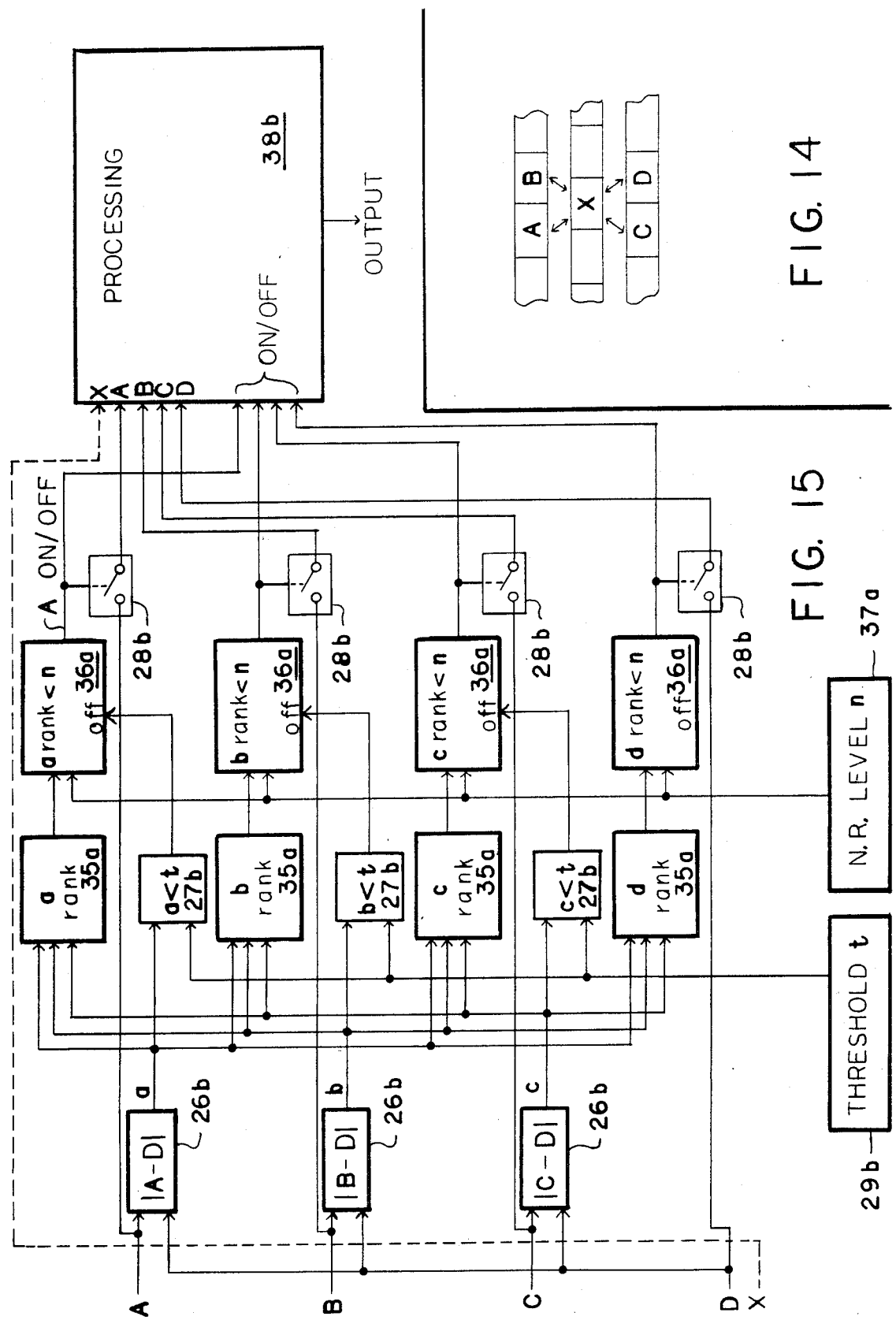

NOISE REDUCTION SYSTEM FOR VIDEO SIGNALS

This application is a continuation of Ser. No. 268,870, filed 06-01-81, now abandoned and a continuation-in-part of U.S. patent application Ser. No. 30,288 filed Apr. 16, 1979 now U.S. Pat. No. 4,305,091 entitled "Electronic Noise Reducing Apparatus and Method", which application in turn is a continuation-in-part of U.S. patent application, Ser. No. 763,904 filed Jan. 31, 1977, now abandoned, entitled "Electronic Noise Reducing Apparatus and Method."

Noise on video signals and in particular low amplitude random noise is a very troublesome problem in television systems. Several methods of removing this noise have been developed which include coreing, comb filters, and recursive temporal integration systems. Coreing systems are generally unacceptable because along with the noise a large amount of detail is lost. Line type comb filters have long been used for chroma separation, with a small signal to noise improvement, and now large scale digital noise reducers which utilize frame delays to implement recursive temporal integration or time averages, are available. Two such devices are described in detail in U.S. Pat. Nos. 4,058,836 Drewery et al. and 4,064,530 Kaiser et al. These recursive time integration systems do a fairly good job of noise reduction, but always introduce an artifact known as motion effect due to the infinite impulse response characteristic of recursive filters, and the problem of frame to frame video differences. The motion effect problem in general prevents the cascading of devices, and limits the amount of useful noise reduction of an individual unit.

It is the object of this invention to provide a high level of noise reduction similar to the temporal integration systems without the inherent motion effect artifacts, or loss of detail as in coreing systems. This is accomplished with a filter operating on picture elements in a continuous analog system, or a discrete sample time system such as would be provided in a digital or charge coupled device system, in either a recursive or non-recursive configuration. Because the filters delay times may be changed automatically in response to the motion of elements in the video, and because the number of coefficients of the filter may also be changed automatically, the bandpass characteristics of the filter may be automatically adjusted to fit the input video signal to a close degree.

Other objects and a fuller understanding of this invention may be had by referring to the following description and claims, taken in conjunction with the accompanying drawings, in which:

Figure 5:
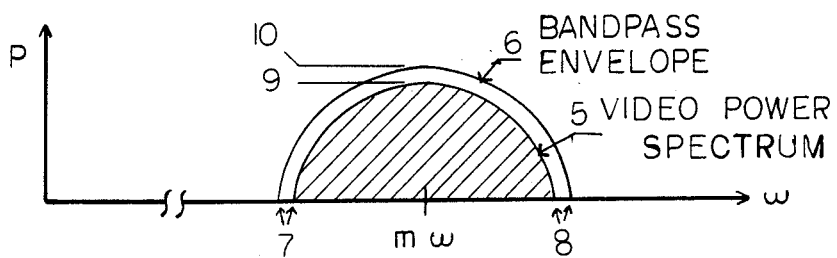
Figure 6:
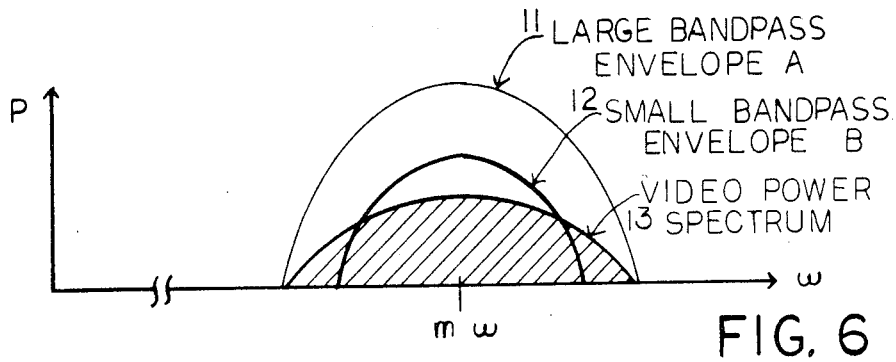
Figure 7:
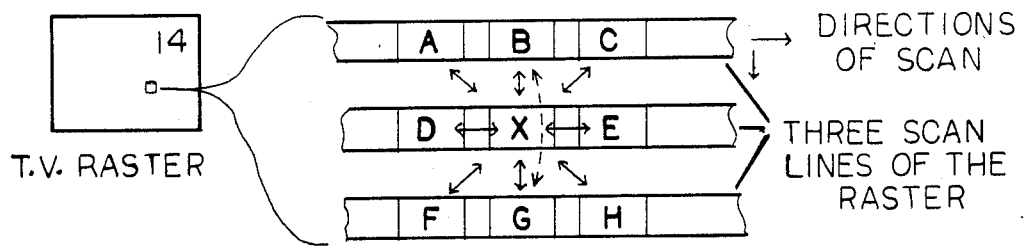
Figure 8:
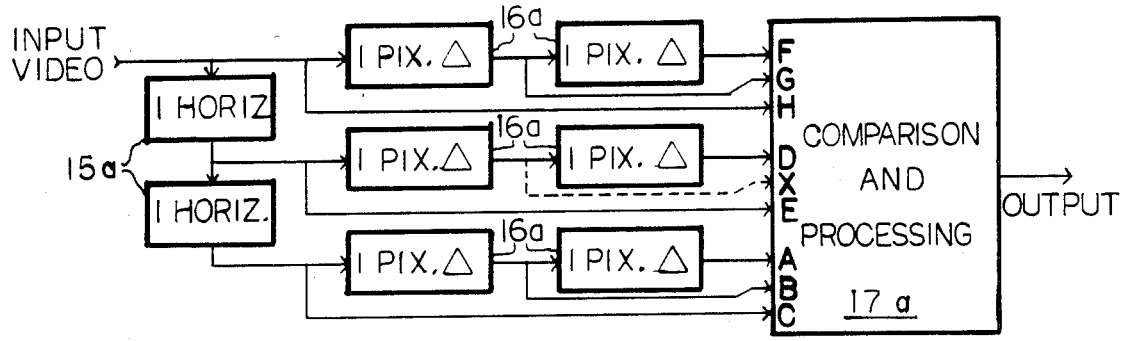
Figure 9:
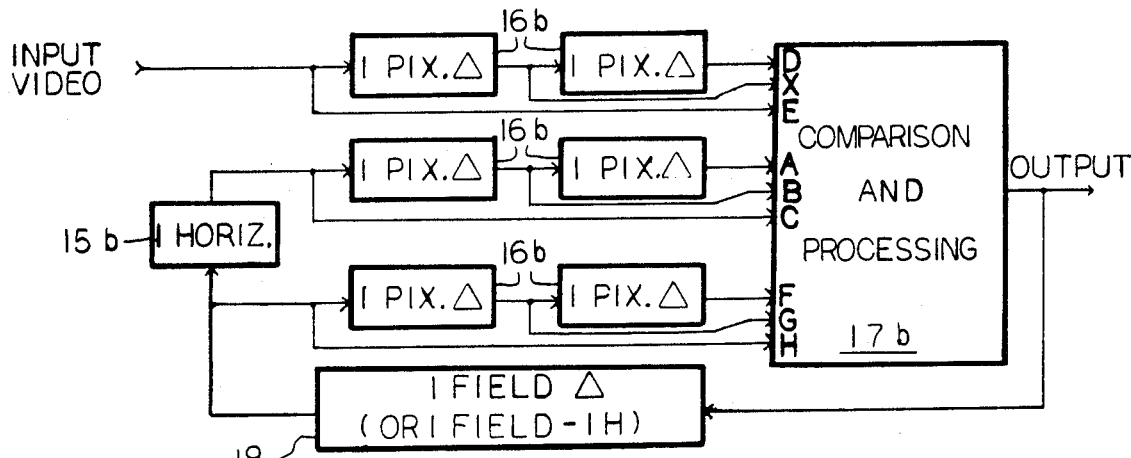
Figure 10:
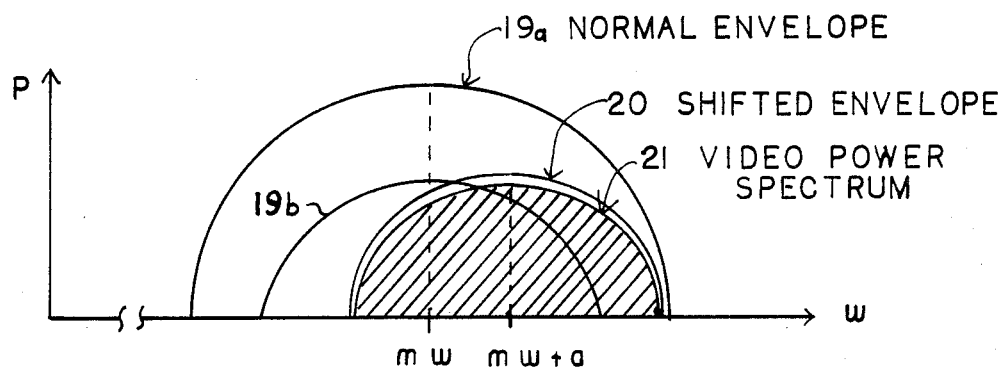
Figure 11:
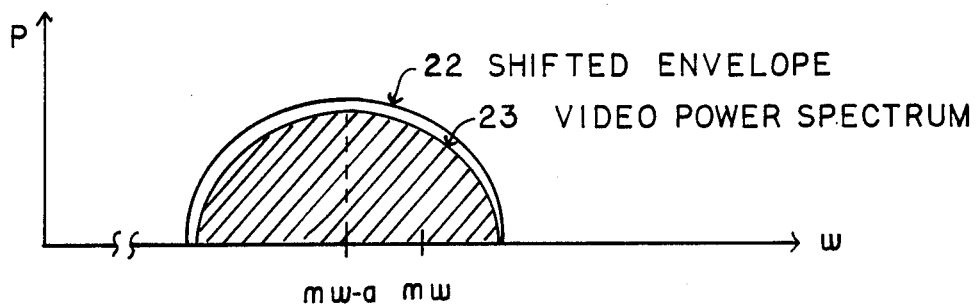
Figure 12:
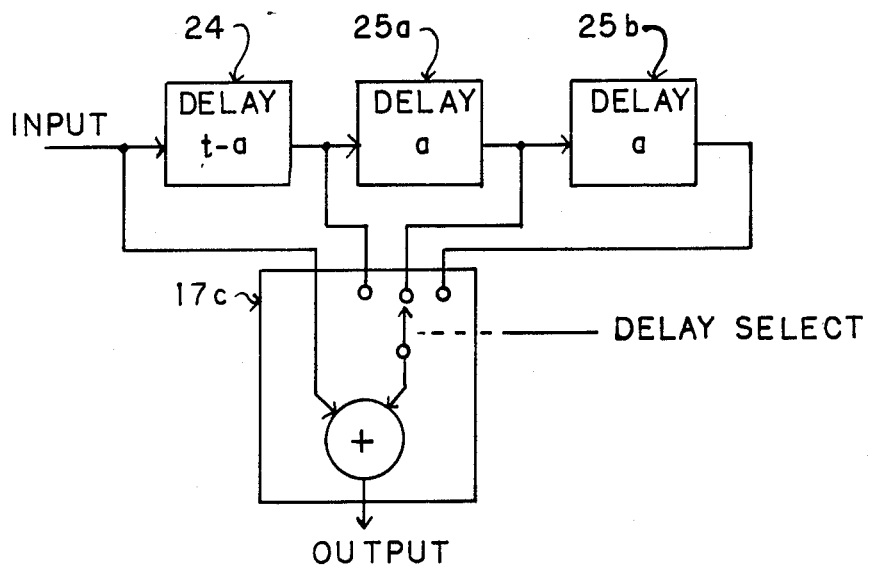
Figure 13:
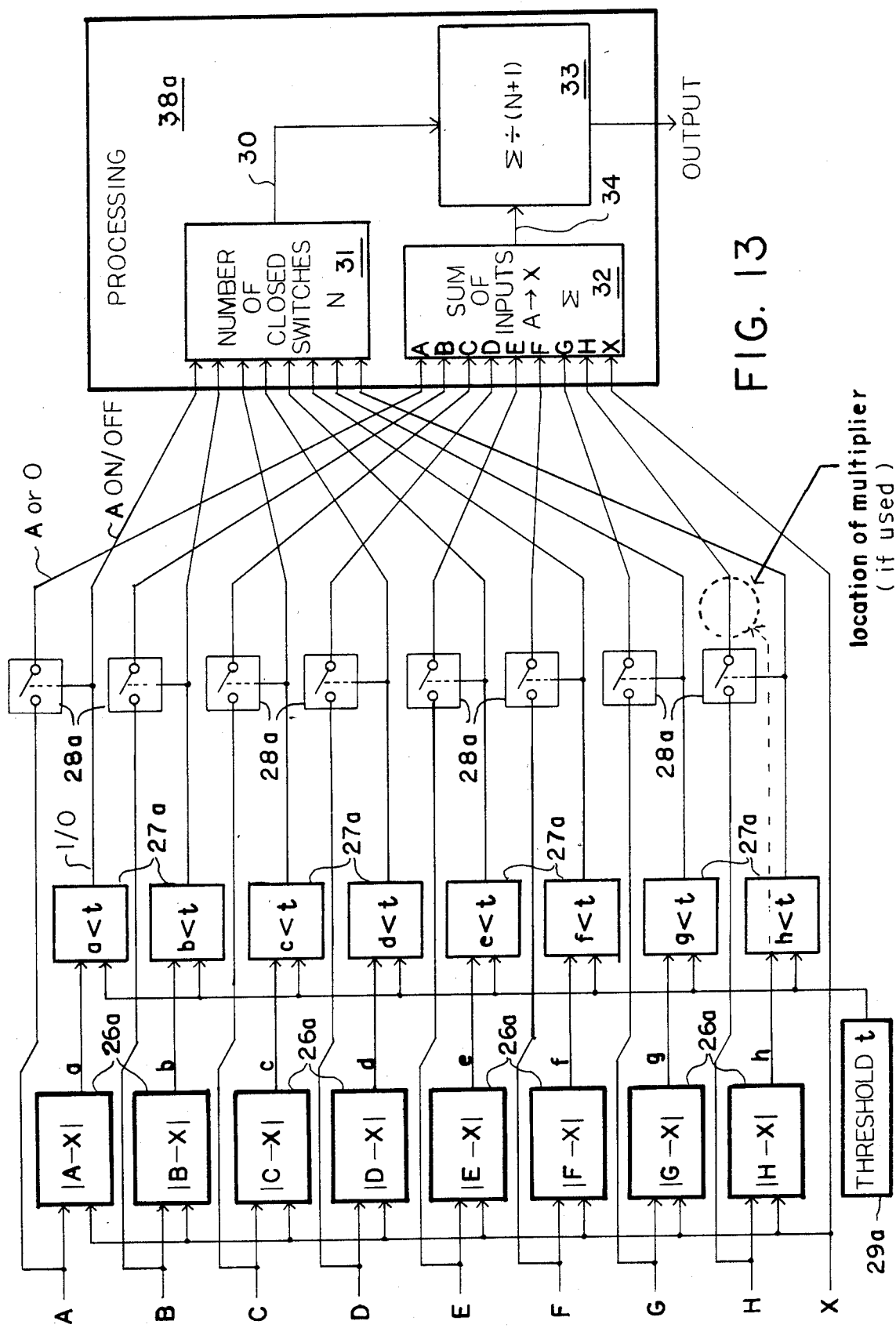
Figure 16:
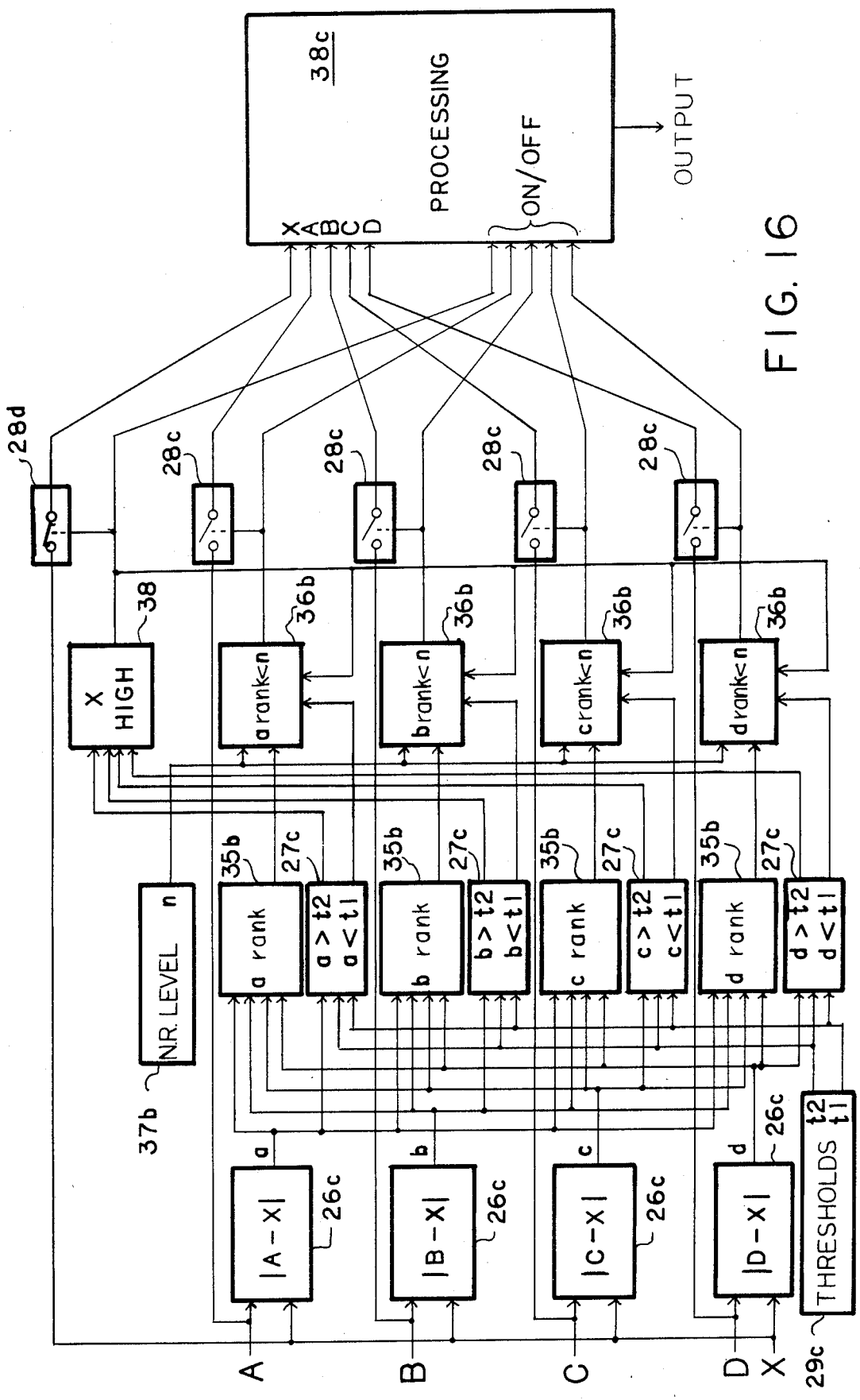

FIG. 5 is a typical video power cluster spectrum 5 having a peak amplitude 9, with an upper band edge at 8 and a lower band edge at 7, and a typical comb filter bandpass envelope 6 having a peak allowable amplitude 10 and having upper and lower band edges also at 8 and 7;

FIG. 6 is a spread video power spectrum 13 with comb filter bandpass envelopes 11 and 12;

FIG. 7 is a drawing of 3 scan lines from some random point in a television raster, showing the location of 9 picture elements A thru H and X;

FIG. 8 is a drawing of a typical delay configuration for the non-recursive form of the noise reducer, having 1 horizontal line delays 15a, 1 pixel delays 16a and comparison and processing circuit 17a;

FIG. 9 is a drawing of a typical delay configuration for the recursive form of the noise reducer having 1 horizontal line delay 15b, 1 pixel delays 16b, 1 field delay 18 and comparison and processing circuit 17b;

FIG. 10 is a shifted video power spectrum 21 with shifted bandpass envelope 20 and noise reducer bandpass envelopes 19a and 19b;

FIG. 11 is a shifted video power spectrum 23 with shifted bandpass envelope 22;

FIG. 12 is an adaptable nonrecursive filter having delays 24, 25a, 25b and processing circuit 17c;

FIG. 13 is a detailed block diagram of a comparison and processing circuit having inputs A thru H and X, absolute value difference computers 26a, magnitude comparators 27a, video switches 28a, threshold number 29a, processing circuit 38a composed of coefficient adder 31 with output 30, pixel summer 32 with output 34 and divider 33;

FIG. 14 is a drawing of 3 scan lines from a random point in a television raster showing the locations of pixels A thru D and X;

FIG. 15 is a detailed block diagram of a comparison and processing circuit having inputs A thru D and X with absolute value difference computers 26b, threshold number 29b, rank computers 35a, magnitude comparators 27b, rank magnitude comparators 36a, video switches 28b, processing circuit 38b and noise reduction level 37a;

FIG. 16 is a detailed block diagram of a comparison and processing block having absolute value difference computers 26c, rank computers 35b, dual magnitude comparators 27c, rank magnitude comparators 36b, video switches 28c and 28d, processing circuit 38c, X high computer 38, noise reduction number 37b and threshold numbers 29c.

Figure 1:
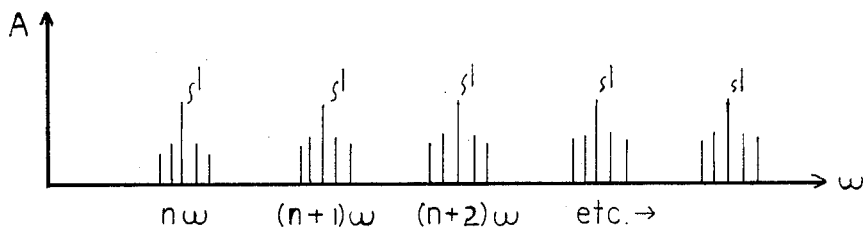
FIG. 1 is a typical video power spectrum with characteristic power clusters 1.
Figure 2:
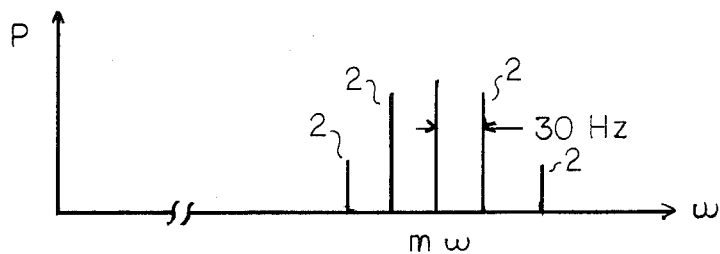
FIG. 2 is a more detailed drawing of one of the power clusters with typical 30 hz. separated sidebands 2.
Figure 3:
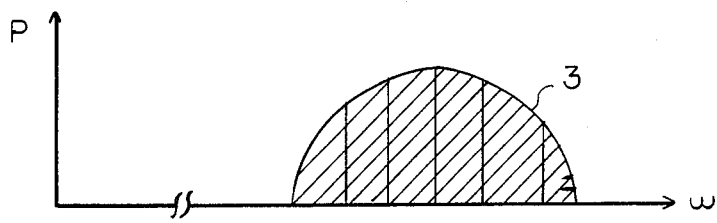
FIG. 3 is a typical video power cluster envelope 3.
Figure 4:
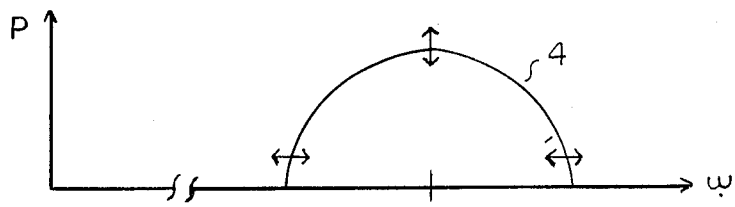
FIG. 4 is a typical video power cluster envelope 4 which depicts characteristic envelope shape changes.

It is the object of video noise reduction systems developed as comb filters to provide a bandpass characteristic which matches the spectrum of the video signal to be improved thus rejecting the noise which is contained in the unused spectrum. The merit of these systems may be understood by inspecting the power versus frequency spectrum of video signals, which are shown in simplified graphic examples in FIGS. 1-4. In FIG. 1 a typical power spectrum is shown with the characteristic power clusters 1 at harmonics of the horizontal scanning frequency w. FIG. 2 is a more detailed drawing of one of the harmonics mw, showing the sidebands 2 of each cluster which are spaced a nominal 30 hz apart in frequency for complex changing video. The 30 hz offset is a result of the frame repetition rate used and would be 25 hz for 50 cycle European systems. If one considers a single picture element, it is obvious that the lowest frequency component of the video signal corresponding to that element, if it is stationary, is the frame rate. In a static video signal, i.e., one scanning a non-changing scene, the amplitude and number of the 30 hz sidebands associated with a given harmonic power spectrum will vary according to the line to line changes in picture detail, and for this purely static signal any given sideband group of a horizontal harmonic has no amplitude modulation or frequency modulation components with respect to time. In a normal video scene having motion and changing images, any of these 30 hz sidebands, 2 of FIG. 2, will have time changing amplitude and frequency components which will take up a part or all of the spectrum around the horizontal harmonic, this spectrum may be depicted as the envelope 3 shown in FIG. 3. The width and amplitude of the envelope will of course be independently changing with the scene information, as is shown by envelope 4 in FIG. 4. For the purpose of the following disclosure, reference to power and bandpass envelopes are in relation to one or more given horizontal harmonic power clusters within the video bandwidth.

In this high performance noise reduction device, the object is to model a comb filter such that the bandpass envelope of the teeth of the filter fit the expected video power clusters at the horizontal harmonics. A diagram of a video power envelope 5 and a comb filter bandpass envelope or tooth 6, for one of the 30 hz sideband groups is shown in a simplified graphic example in FIG. 5. In actual practice, the envelopes of FIGS. 3-6 would be much more complex if viewed on a spectrum analyzer or plotted with a high degree of accuracy, however these drawings will still serve to illustrate the important concepts relating to this invention. Obviously, the closer the bandpass envelope 6 fits the video power envelope 5 with respect to their upper and lower cutoff frequencies 8 and 7, the better the rejection of out of band noise and thus noise reduction of the signal will be. If the bandpass envelope also limits the video amplitude 9 to a level slightly higher than that needed to pass the video information as is shown by 10, thus high amplitude noise spikes will also be limited. Both envelopes 5 and 6 in FIG. 5 are representations of complex series of 30 hz elements. The devices in the previously mentioned Drewery and Kaiser patents operate to adjust the width of the bandpass envelope, i.e., changing the allowable number of the 30 hz elements within the bandpass envelope so that the entire video power envelope may be passed, while keeping the distance between upper and lower cutoff frequencies, or width of the bandpass envelope 6 as small as possible, however it is not possible to adjust the cutoff frequencies and width independently. In the device described by Kaiser et al. the coefficients of the input and delayed signals are changed in order to vary the noise reduction levels which causes the size of the bandpass envelope to change. It should be noted that by changing these coefficients that it is not possible to modify the shape of the bandpass envelope, i.e., to change the width independent of the amplitude, or to change the center frequency of the envelope of the 30 hz components. As shown in FIG. 6, when the video power spectrum 13 broadens due to changing video, the bandpass envelope may be increased as is shown in 11 to pass all of the video spectrum with very little noise reduction, or a compromise is set such as 12 which achieves moderate noise reduction and some loss of video information. As a result of the limited control over the shape, and position of the 30 hz components within the bandpass envelope, serious mismatching of the bandpass and power envelopes can occur, such as in FIG. 6.

The noise reduction system for electronic signals disclosed herein operates on a spatial technique in which each picture element within a television raster 14 is compared to the elements surrounding it such as X and A thru H respectively, as shown in solid line typically in FIG. 7, with said picture element being selectively combined with those surrounding elements which are similar to the central element in a product, a sum, a mean, a weighted average or similar mathematical process. The actual mathematical process used is relatively unimportant from a noise performance standpoint since all average and mean type processes give approximately the same level of noise reduction, however other image processes may be combined in this function as will be discussed later. It is important to note that for removing low amplitude noise the surrounding picture elements are not compared with each other, but only with the central element and there is no need to compute any two dimensional measure of the surface deviation or flexure about the central element. As was disclosed previously the surrounding elements do not have to be truly adjacent or symmetrically patterned, however experimental results indicate that the adjacent symmetrically patterned elements are best. Note, however, that surrounding elements can be directly compared as shown for example in dotted line in FIG. 7. The area covered by these the examined elements may be referred to as the inspection area. For the purpose of the following disclosure it will be assumed that these elements are discrete time elements such as samples in a digital system, however the disclosed concepts will apply equally to any continuous analog system where the elements are continuous and not broken or sampled into individual units. This may be effected in hardware by replacing all memories or shift registers used by digital systems with analog delay lines. Analog delay lines are of course available in either fixed delay length and variable delay length configurations.

The above process may take on either a recursive or nonrecursive form and may operate on a varying number of surrounding elements depending on the desired cost versus performance and complexities involved. The sampling system used and as a result the alignment of the sampled elements from line to line will also affect the number of elements used and delay structure to arrive at those elements. One should note that the elements shown in FIG. 7 are aligned vertically and those of FIG. 14 are offset from line to line showing 2 common systems which may be used. The particular considerations of sampling schemes will be obvious to one skilled in the art and will not be discussed further. A typical nonrecursive system would look like that of FIG. 8 and a recursive system like that of FIG. 9. The dotted line FIG. 8 recognizes that the element x can be omitted from the comparison and processing of the signals. FIGS. 13, 15 and 16 disclose various embodiments of the comparison and processing circuitry of FIGS. 8 and 9. The object and operation of the comparison and processing circuits are the same for any system; only the configuration of the delays 15, 16 and 18 used to generate the central and surrounding picture elements X and A through H respectively is changed in order to optimize the system for a particular application. The changes from non-recursive to recursive systems are essentially the same as for textbook digital filters and will not be extensively discussed. Inputs to the comparison and processing circuit 17a in FIG. 8 and 17b of FIG. 9 are labeled A thru F and X corresponding to where these elements appear in the raster as shown in FIG. 7.

As was previously mentioned, the video 30 hz sideband shape is a result of both the line to line detail changes and frame to frame detail changes. A special case where a displayed image changes in its raster position from frame to frame while the image itself remains relative unchanged frequently occurs in video. An example of this would be where a camera pans a fixed scene with little detail around the edges of the frame. The effect of this type of changing video is to greatly broaden and frequency shift the 30 hz components of the video power envelope while the amplitude remains relatively constant such as shown in FIGS. 10 and 11. If one considers a given pixel which is moving in the frame, that element's lowest frequency component is no longer the frame rate that it was when stationary, but has been changed by the amount of motion. If the element were to move 2 scan lines up per frame, the lowest frequency component would be 1 frame less 2 H, thus giving a positive frequency shift by an amount a to the video power spectrum such as is shown by 21 in FIG. 10. This situation gives rise to the mismatching of envelopes similar to that previously mentioned, and is shown by 19b and 21 of FIG. 10. If the picture elements were to move down in the frame a negative frequency shift such as shown by 23 of FIG. 11 would be created. Because the envelope center frequency cannot be shifted the two options available to a temporal integration noise reducer such as those previously discussed are to increase the bandpass envelope like 19a of FIG. 10 to broaden the allowable number of 30 hz components to pass all of the components of the video information but provide little noise reduction, or to set a compromise position such as shown by 19b of FIG. 10 which provides moderate noise reduction, and some loss of video information. Unfortunately, in most state of the art noise reducers, the smaller envelope 19b will be used and most of the video information which is lost contains frame to frame detail information. In a recursive type of system this lost detail is accentuated due to the infinite impulse response characteristic, giving a smear effect on the edges of moving images which is known in the industry as motion effect. The primary reason for motion effect is the lack of ability of noise reducers to change the shape and frequency position of the bandpass envelope, independent of the allowable amplitude characteristic to match the video envelope adequately. The mechanism needed to accomplish this is an adaptive time delay system which can track moving picture elements from frame to frame or field to field.

A simple diagram of such an adaptive system is shown in FIG. 12. If the 3 position switch of 17c is in the middle position the filter will have bandpass teeth at some frequency spacing w which is determined by the length of delays 24 and 25a. If one assumes 24 is a delay of t−a, and 25a and b each have a delay of a with t being much larger than a, then the 3 position switch will be able to select delays of t−a, t and t+a. The switch selection will then have the effect of shifting the bandpass envelope in frequency by a small amount determined by a. The bandpass envelope will look like 20 and 22 of FIGS. 10 and 11 and one can see that by selecting the proper switch position the filter's frequency characteristic can be made to closely match the video power spectrum. The operation of the filter may be simply explained by assuming that the delay t is equal to the repetition period, i.e., 1/frequency of a sine wave signal to be passed by the filter. The middle switch position will be selected and the input signal will be summed with the input signal which has been delayed by t or one wave length thus giving an output equal to twice the input. If another signal is input which has a wave length of 2t there will be no output since the input will be combined with the signal delayed by t, which corresponds to a 180° phase shift, i.e., two signals of exact opposite phase are added with a sum of 0. If the wanted signal now shifts either up or down in frequency by an amount 1/a a different switch position may be selected to adjust the filter bandpass characteristic accordingly. Thus for a signal having a repetition period of t+2a the right switch position would need to be selected to give the optimum delay, and for a signal having a repetition period of t the left switch would be selected. In general for this type of filter the delay should be selected to match the repetition period of the wanted signal. The method of determining what delay length is to be used is a nontrivial matter, and is one of the inventive concepts of this device and method, as will be discussed later in this disclosure. One skilled in the art can envision a system where the three delays and switch would be replaced with a single variable length delay such as a CCD device clocked with a variable frequency clock.

Referring to FIG. 13, the least complex comparison and processing system, each of the pixels from the delays is input to an arithmatic block 26a along with pixel X, where the absolute value of the difference between X and the respective pixel is computed. Each of these absolute value differences, a for pixel A, b for B, etc. is compared to a threshold t, 29a, in blocks 27a to determine if the difference is less than the threshold 29a. If the difference is less than the threshold, a switch 28a is closed which allows the corresponding pixel to be input to the processing circuit 38a, otherwise the switch 28a is opened which inputs a zero, this action allows only picture elements which are similar to X to be input to the processing circuit 38a. For the purpose of this explanation the threshold is assumed to be a fixed number, however one skilled in the art recognize that it would be useful to make the threshold automatically variable in response to the signal to noise ratio of the incoming video signal, or to the video content of said signal. The threshold would be adjusted to a relatively small value for good S/N ratios, and a large value for poor S/N ratios. In section 32 the processing circuit sums all of the pixels including pixel X, which are input to it. Section 31 adds the coefficients of the elements input to the processing circuit at section 32, either by summing all the coefficients of the switches (one or zero) or alternately by adding multiplier coefficients as discussed later, and section 33 divides 34, the sum of the picture elements by the total of coefficients of picture elements summed 30, thus computing the average of those elements. Alternately the root mean square, product or other combination could be used to generate a replacement value or output for element x. This average is the normalized noise reduced signal which is output from the device. Of course each of the switch functions 28a could be replaced with or supplemented by a multiplier (or divider) as shown in the H signal path in FIG. 13, to perform a weighted average such as a gaussian weighted response of the elements selected. Such a system might perform the weighting function in a fixed on/off mode or the weighting might be adjusted according to the computed difference A thru H of FIG. 13, or alternately according to the rank which will be discussed later. For example the weighting given to element A might be (1−a') where the function is defined by A(1−a') where A is the value of element A, a' is the normalized value of a, i.e., a÷(2× maximum allowable value of A). The multiplier could also be used in order to provide weighting of each element to perform other image operations such as unsharp masking, lag reduction and spatial enhancement, or as a replacement for the switch 28a. The coefficient of the multiplier (or divider) would be controlled by the difference computed in 26a or the threshold comparison output from 27a. Typical noise reduction results output from the processing means would then be like $(A+B+C+D+E+F+G+H+X) \div 9$ where all differences are less than t, or $(A+B+C+X) \div 4$ where only differences a, b and c are less than t or only X where all differences are greater than t. For spatial enhancement one typical output would be $(jA+kB+jC+kD+kE+jF+kG+jH+X) \div m$ where the coefficients j and k are fixed multiplier constants, or zero as determined by 26a and 27a, and m is the normalization number, i.e., the sum of the absolute value of the coefficients +1, corresponding to 30. The actual weighting function and values used would depend on the quality of the video signal being processed. If the signal were soft due to the use of a low quality camera for origination, spatial enhancements would be used to sharpen the video images to a more pleasing level, if the video contained lag due to low light conditions a lag reduction operation could be performed. Actual coefficients to accomplish these functions have been developed by computer image processing devices which operate on still pictures, and a study of computer image processing will reveal actual coefficients which can be used to correct video image defects. A typical set of values for a high pass (detail enhancement) filter would be $j = -0.25$ and $k = -0.5$. If A, B, and C had differences less than t the output would then be $[(-0.25A)+(-0.5B)+(-0.25C)+X] \div 2$.

In FIG. 15 a more complex processing and comparison system for a five element scheme such as is shown in FIG. 14, is illustrated. FIG. 15 contains the same difference computing arithmetic block, 26b, corresponding to 26a for each element, the same threshold comparison system, 29b and 27b corresponding to 29a and 27a respectively, the same picture element switches, 28b, corresponding to 28a and the same processing circuit 38b corresponding to 38a to average the selected pixels as does the system of FIG. 13. FIG. 15 does differ by the addition of a rank computers 35a and rank to noise reduction level comparison 36a for each difference. It is the function of the rank computers 35a to compare each difference a thru d to all of the other differences to determine how many of the other differences it is greater than. Each difference is given a rank from 0 to N where N is one less than the total number of differences, in this instance N=3. For example, if the differences had magnitudes of: a=3, b=4, c=9, d=5, the ranks would be a=0, since a is larger than none of the other differences, b=1, c=3, d=2. It is of course possible for two or more differences to have the same rank, if they had the same difference value. Each difference's rank is in turn compared to the noise reduction level 37a in 36a, if the rank is smaller than the N.R. level 37a and if the difference is smaller than the threshold t, 29b, the corresponding switch 28b for that element is closed inputting said element to the processing circuit 38b. Switch 28b could be replaced or augmented by a multiplier or other operation as in the previous example. As with the threshold 29a of the previous example, the N.R. level 37a could be adjustable in response to input video. Since any difference greater than 29b will probably have a high rank it also would be possible to delete 29b and 27b at a sacrifice in performance, and small cost savings. The processing circuit will compute the average of all elements input to it as in the system 38a of FIG. 13. If either the difference for an element is larger than the threshold t, 29b, or the rank of that difference is larger than the N.R. level, 37a, then the switch 28b or multiplier for that element is forced to input a zero to the processing circuit 38b. Of course individual thresholds or N.R. levels could be used for each element, which would give preference to the direction of elements averaged and the switch 28b could be replaced with or augmented by a multiplier as discussed previously.

If one assumes that in the area of inspection the picture had moved 1 vertical line up in the past field of time, then element X which is currently input to the device would be from the same point on the televised image as that which is output from the memory corresponding to the area immediately below X, on the line from the preceding field. This point is represented by the junction between pixels C and D of FIG. 14 (or pixel G of FIG. 7). These elements would then have a very low rank, since they correspond to approximately the same point on the image as x, and would be input to the processing block. The filter will have tracked the movement causing the time delay to be adjusted accordingly, by the process of rank selection of pixels. One can see that it would be wise to use enough elements in this system to cover all of the possible locations that an input pixel could move to or from within a one field (or alternatively 1 frame) amount of time, in order for the filter to track any possible motion in the input video signal. Referring to FIG. 16. It will be seen that the system of FIG. 16 is similar to that of FIG. 15, except that 2 thresholds are output from 29c, 2 comparisons are made in each of the magnitude comparators 27c, an extra circuit, the X high circuit 38 has been added which controls a video switch 28d in the X video line input to the processing circuit 38c. In the previously discussed circuits of FIG. 13 and FIG. 15 it has been assumed that pixel X would always be averaged with the other elements input to the processing circuit.

In some video applications, in particular digital applications, a noise situation exists which corresponds to a digital bit error which will cause a gross amplitude change in an individual pixel. An example of this would be in an application using a solid state RAM or in a digital data transmission channel where a MSB bit is defective due to noise. In the circuits of FIGS. 13 and 15 this gross amplitude change occurring on pixel X would cause all of the magnitude comparators to sense differences greater than the threshold t, thus effectively passing pixel X to the output unaveraged. In the circuit of FIG. 16 the magnitude comparators essentially compare the differences to two thresholds, t1 and t2. Threshold t1 can be assumed to have the same value and effect as does t of FIGS. 13 and 15. Threshold t2 is a much higher threshold used to detect gross amplitude differences. The t2 threshold comparison for each difference is input to the X high circuit 38. If a number of differences, nominally two or more, have exceeded the t2 threshold, 38 opens the video switch 28d for pixel X and forces the other rank comparators to close their respective video switches thus inputting all pixels except X into the processing circuit 38c. In the simplest configuration, processing circuit 38c will average all the pixels input to it, thus outputting this value for the noise reduced value of X.

Experimental results have shown the above processing system adequate for occasional random gross amplitude errors, however when these gross amplitude errors increase in frequency it may be desirable to average only a small number of surrounding pixels, those which are closest in magnitude to each other. These close magnitude pixels represent the minimum brightness gradient or the surface contour having the least amount of deflection or change within the area under inspection, and their average statistically represents the highest probability of the true noise free value of X. For the pixels within the area of FIG. 7 the minimum gradient would be the smallest magnitude of A-H, B-G, C-F or D-E which would be determined with difference circuits like 26b operating on each pair of elements and rank computer 35a of FIG. 15, i.e., the minimum gradient would also have the smallest rank. The output of the processing system would be the average of those two pixels having the smallest difference if X was determined to have a gross error. The circuitry which would need to be added to the processing circuit of FIG. 16 to accomplish a minimum gradient average is minimal and would be an elementary design task to one skilled in the art. Similar minimum brightness gradient circuitry was also discussed by Graham in U.S. Pat. No. 3,009,016. It should be noted however that if pixel X does not suffer from gross amplitude noise, and has a difference less than threshold t, the system of either FIG. 15 or 16 will inherently compute an average of pixels because of the operation of the rank computers and rank threshold comparison, as was previously discussed.

In many systems which operate on digital video signals there is circuitry included to detect bit or gross errors as part of such systems. In these systems it would be unnecessary to include the X high circuitry 38 and the associated threshold t2 and comparison circuitry since errors on pixel X have already been detected. The external system error detector would merely need to be coupled to the rank computers 36b, the X video switch 28d and processing means 38c as was the X high circuit 38.

The element x need not be used in the treatment of normal television signals (element x containing very little information not present in neighboring pixels) or in defective television images (wherein the neighboring pixels statistically have a high probability of representing the true noise free value of x). The neighboring pixels could thus be directly compared with the results used to replace a different pixel. A mathematical process to do this could be accomplished by deleting element x from the processing means in FIGS. 15 and 16, using a different subtrahend in FIG. 13, or otherwise.

The operation of the noise reduction device has been discussed in relation to FIGS. 13, 15 and 16 in order to clearly explain how the device functions, however it will be clear to one skilled in the art that several of the functions could be combined or implemented in a different fashion as is convenient in order to optimize the design to meet a particular set of goals such as low cost, portability or high performance. It is considered obvious that the hardware used to implement any of the various functions such as the delays 15a, b and 18 could be shared with another device, such as would be the case if this invention were constructed as a secondary feature or option of another device such as a television frame synchronizer, or that the video signal could be output from the main memory via a different port thus giving the video output a variable delay and essentially the ability to perform a timebase corrector or synchronizer capability.

Of particular interest for state of the art television systems is the recursive system shown in FIG. 9 because of its unique and efficient relationship when used in a 2:1 interlace system. In the arrangement of FIG. 9 the input video picture element X is compared to those surrounding it (see FIG. 7). However it may be noted that by carefully selecting the length of the large delay 18, so that it provides at its output the line above the input line, (which may require a change in delay length to compensate for interlace on even or odd fields) elements ABCFG and H will be from the field previous to element X. This situation has the requirement of approximately a 1 field delay for 18, rather than a 1 frame delay which is most often used in recursive temporal average systems, with the obvious cost advantage. By combining the system configuration of FIG. 9 with the processing and comparison system of FIG. 15 or FIG. 16, which has been expanded to handle 9 total elements, a very good cost vs. performance ratio is achieved. One can see that by the previously described system of FIG. 15 or FIG. 16 of selecting pixels which surround X to average together in this recursive scheme of FIG. 9, a form of adaptive recursive comb filter is effected. It is most important to note that the delay used is variable by the amounts controlled by the selection of the surrounding elements. For example, in FIG. 9, if pixel C is selected the delay is 1 H more than if pixel H is selected. Referring to the previous discussion Line relating to the shape of the bandpass envelope one should understand that it is this variable delay arrangement which coupled with averaging variable numbers of pixels, which may have variable weighting, can cause both the width and allowable amplitude of, as well as the position of 30 hz components of the bandpass envelope to change independently and automatically in order to provide a close fit to the video power spectrum envelope, as well as providing spatial image processing.

The above described system which utilizes a field delay proves in practice to be extremely cost effective and of high performance when compared to frame recursive devices which are currently commercially available. To one skilled in the art it should be obvious that there are many variations of this system which may be constructed to fit a given need. In particular a much more elegant system could be built which utilizes a full frame delay thus allowing an input pixel to be compared with those pixels surrounding it in both the previous field and the previous frame. Less or more than the suggested nine elements could also be used with a group of central elements being compared to a group of surrounding elements. A system could also be built which allows the comparison of one or more input pixels to a number of the pixels surrounding it, but from the previous frame or a multiple number of frames or fields. It may be noted that in all cases the delayed element corresponding to input element X i.e. that element corresponding to the same point on the raster as X need not be used if a sufficient number of surrounding elements are used, since it is reasonable to assume that the delayed element corresponding to X contains very little information not already contained in those pixels which surround it, for normal television scenes.

What is claimed is:

1. Apparatus for reducing noise on an input televison video signal which apparatus contains a comparison circuit means responsive to said input video signal to compare a central picture element of said video signal to at least one of the surrounding picture elements of said video signal to determine the difference thereof and to further compare said difference to a threshold, said threshold adjusted automatically in response to said input television video signal, and a processing circuit responsive to said picture elements and said comparison to sum portions of said surrounding element and said central element if said difference corresponding to said surrounding element is less than said threshold, with said portion of surrounding element being decreased otherwise, which decreased portion may be zero and which sum is the noise reduced value substituted for said central element by said processing circuit before said signal is output from said apparatus.

2. Apparatus for reducing noise on an input televison video signal which apparatus contains a comparison circuit means responsive to said input video signal to compare a central picture element of said video signal to at least one of the surrounding picture elements of said video signal to determine the difference thereof and to further compare said difference to a threshold, a processing circuit responsive to said picture elements and said comparison to sum portions of said surrounding element and said central element if said difference corresponding to said surrounding element is less than said threshold, with said portion of said surrounding element being decreased otherwise, which decreased portion may be zero and which sum is the noise reduced value substituted for said central element by said processing circuit before said signal is output from said apparatus, a second comparison circuit responsive to differences from multiple surrounding elements wherein said differences are compared to each other allowing said multiple surrounding elements to be ranked according to their respective differences with only a number of said surrounding elements which have the smallest differences being summed with said central element which number of surrounding elements may be a number set by an operator or may be responsive to said input video signal in either delayed or undelayed form.

3. Apparatus as claimed in claim 2 wherein the number of said surrounding elements combined is responsive to the amount of noise on said input video signal in delayed or undelayed form.

4. Apparatus as claimed in claim 2 wherein the number of said surrounding elements combined is responsive to the information content of said input television video signal in delayed or undelayed form.

5. A method for reducing noise on a video signal which noise may result from errors occurring in a video signal system with said method containing a comparison step to compare a central video element of said video signal to two or more of the video elements surrounding said central element as viewed on the television raster to determine the difference thereof, and a processing step responsive to said comparison to determine if said difference is greater than a threshold and to replace a noisy central video element with a combination of at least two surrounding elements which may be the same or different elements as said compared elements with said replacement ocuring when said central video element differs from said two or more of the compared surrounding elements by more than said threshold.

6. A method as claimed in claim 5 wherein said two combined surrounding samples have a difference which is less than the difference of any two other surrounding samples as determined by a further comparison step.

7. A method as claimed in claim 5 wherein said two combined surrounding samples are adjacent to said noisy central video sample and constitute the minimum brightness gradient across said noisy video sample as determined by said further comparison step.

8. The method of claim 5 wherein the surrounding video elements of the combination are from the scan line above and scan line below the central video element and from the same field.

9. A method for reducing noise on a set of pixels derived from an optical image including the steps of comparing two pixels to determine the difference thereof, comparing said difference to a reference to determine the larger thereof and replacing a given pixel with a combination of other pixels in response to said comparison to said reference, said combination representing a noise reduced given pixel.

10. The method for reducing noise of claim 9 wherein the two pixels being compared to determine the difference thereof are different than the given pixel replaced.

11. The method for reducing noise of claim 10 wherein the given pixel is used in the combination of pixels.

12. The method of claim 9 wherein the given pixel is located between two compared pixels.

13. The method of claim 9 wherein the given pixel and compared pixels are each on a separate scan line from the same field and are aligned in a straight line on the raster.

14. The method of claim 9 wherein the given pixel and compared pixels are from the same point on the raster but each located in a different frame.

15. A method for reducing noise on a video signal comprising the steps of comparing a given pixel to other pixels to determine whether the difference between each of such other pixels and the given pixel is less than a reference threshold level, combining said given pixel and those other pixels that are within said reference threshold level of said given pixel, the total number of pixel signals used in this combining varying and outputing the combination, this combination increasing the apparent signal to noise ratio of the video signal.

16. Method as claimed in claim 15 wherein said combinations includes summing said given pixel and those other pixels within said reference threshold of said given pixel and dividing said sum by the total number of pixels summed.

17. A method for reducing noise on an electronic signal derived by scanning a image comprising the steps of comparing a given element of said signal to each of two or more other elements of said signal to determine the difference thereof, comparing each difference to the other differences to determine which of said other elements has the smallest corresponding difference and combining the element having the smallest corresponding difference with at least said given element to provide a noise reduced element which may be substituted for said given element.

18. A method for reducing noise on a signal derived by scanning an image comprising the steps of establishing a reference threshold level, comparing a central pixel to adjacent pixels to determine whether the absolute value of the difference between each of such adjacent pixels and the central pixel is less than said reference threshold level, and computing an average of said central pixel and those adjacent pixels that are within said reference threshold level of said central pixel, the total number of pixel signals used in computing this average varying and outputting this average as the value of said central pixel, this averaging increasing the apparent signal to noise ratio of the video signal.

19. A method for reducing noise on a signal derived by scanning an image comprising the steps of establishing a reference threshold level, comparing the level of a central pixel to the levels of a plurality of the surrounding pixels to determine whether the absolute value of the difference between each of such surrounding pixels and the central pixel is less than said reference threshold level, computing the sum of the levels of said surrounding pixels that are within said threshold reference level of said level of said central pixel plus the level of said central pixel, computing the number of pixels summed, dividing said sum by said number to determine an average value for the levels of similar pixels, and outputting said value for said central pixel, this process increasing the apparent signal to noise ratio of the video signal.

20. A method for reducing noise on a video signal comprising the steps of establishing a reference threshold level, comparing the level of a first pixel to the levels of a plurality of the adjacent pixels to determine whether the absolute value of the difference between each of the compared adjacent pixels and said first pixel is less than said reference threshold level, computing the sum of the levels of said compared adjacent pixels that are within said threshold reference level of said level of said first pixel plus the level of said first pixel, computing the number of pixels summed, dividing said sum by said number to determine a value for the levels of similar pixels, and outputting said value for said first pixel, this process reducing the apparent noise of the video signal.

21. A method for reducing noise on a video signal comprising the steps of comparing the level of a given pixel to the level of neighboring pixels to determine whether the difference between each of said neighboring pixels and said given pixel is less than a reference threshold level, computing the sum of the levels of said neighboring pixels that are within said threshold reference level of said level of said given pixel plus the level of said given pixel, computing the number of pixels summed, dividing said sum by said number to determine a value for the levels of similar pixels, and outputting said value for said given pixel, this process increasing the apparent signal to said noise ratio of the video signal.

22. An apparatus for reducing noise on a series of pixels derived from a video signal, said apparatus comprising means to compare a given pixel to other pixels to determine whether or not the difference between each of such other pixels and the given pixel is less than a reference threshold level, and means to compute an average of said given pixel with those other pixels that are within said reference threshold level of said given pixel, the total number of pixel signals used in computing this average varying and means to output the average as the value of said given pixel, this averaging increasing the apparent signal to noise ratio of the video signal.

23. An apparatus for reducing noise on a series of pixels derived from a video signal comprising means of establishing a reference threshold level, means of comparing a central pixel to surrounding pixels to determine whether the difference between each of such surrounding pixels and the central pixel is less than said reference threshold level, means to average said central pixel and those surrounding pixels that are within said reference threshold level of said central pixel, the total number of pixel signals used in this average varying and means to output this average as the value of said central pixel, this averaging increasing the apparent signal to noise ratio of the video signal.

24. Apparatus for reducing noise on a group of pixels derived from a video signal including in combination means responsive to the difference between a given pixel and at least one other pixel to compare said difference to two threshold levels to determine the greater of said difference and each of said threshold levels and means for substituting a combination of two or more pixels for said given pixel in response to said comparisons.

25. A method for reducing noise on a set of pixels derived from an optical image including the steps of comparing two neighboring pixels to determine the difference thereof, comparing said difference to a reference to determine the larger thereof and replacing a third neighboring pixel located between said first two neighboring pixels with a combination including neighboring pixels in response to said comparison to said reference, said combination representing a noise reduced third pixel.

26. Method of claim 25 where first two pixels are chosen so that they have the same color subcarrier phase.

27. The method for reducing noise of claim 25 wherein the two neighboring pixels are combined to produce the combination of the neighboring pixels used to replace the third pixel.

28. The method for reducing noise of claim 27 wherein the third neighboring pixel is also used in the combination of the neighboring pixels.

29. The method for reducing noise of claim 25 wherein the reference is a percentage of signal type reference.

30. The method of claim 25 wherein said set of pixels consists of three pixels taken from three consecutive scan lines from the same field of an NTSC video signal with said third neighboring pixel being from the central scan line of said three scan lines and with one said compared neighboring pixel being from one of the other of the three scan lines and the other said compared neighboring pixel being from the third scan line.

31. The method of claim 25 wherein said combination of pixels is made such that noise is reduced on the color subcarrier.

32. The method of claim 25 wherein determining said difference includes subtracting a first pixel from a second pixel, and further including taking the absolute value of the result.

33. The method of claim 25 wherein said pixels include the color subcarrier of an NTSC video signal.

34. The method of claim 25 wherein said pixels are represented in digital form.

35. The method of claim 25 wherein said pixels are represented in analog form.

36. A method for reducing noise on a video signal comprising the steps of selecting neighboring picture elements from the signal, examining said elements to determine their respective levels, ranking said elements according to their respective levels, combining all said elements within a chosen rank to produce a replacement value and outputting said replacement value in the place of one of said elements within chosen rank, this processing increasing the apparent signal to noise ratio of the video signal.

37. A method for reducing noise on a video signal comprising the steps of selecting a first and neighboring picture elements from the signal, examining said first and neighboring elements to determine their respective levels, setting a threshold, examining the levels of said neighboring elements to determine whether the level of any of said neighboring elements are within the level of said threshold of the level of said first element, ranking said neighboring elements within said threshold of said first element, combining all said within threshold neighboring elements within a chosen rank and outputting said combination of all said within threshold neighboring elements within said chosen rank in the place of said first element, this process increasing the apparent signal to noise ratio of the video signal.

38. A method for reducing noise on a video signal comprising the steps of selecting neighboring picture elements from the signal, selecting a reference, examining the levels of said elements to determine whether the level of any of said elements are within said reference of the other of said elements, combining said elements that are within said reference to each other, to produce a replacement value and outputting said replacement value of said elements that are within said reference of each other in place of one of said element that is within said reference of each other, this increasing the apparent signal to noise ratio of the video signal.

39. A method for reducing noise on a video signal comprising the steps of selecting a first and neighboring picture elements from the signal, examining said elements to determine their respective levels, setting a threshold, comparing the levels of said neighboring elements to determine whether the level of any of said neighboring elements are within said threshold of said first element, combining said neighboring elements that are within said threshold of said first element, and outputing said combination of said neighboring elements that are within said threshold of said first element in place of said first element, this process increasing the apparent signal to noise ratio of the video signal.

40. A method for reducing noise on a video signal comprising the steps of selecting neighboring picture elements from the signal, selecting a reference, comparing the levels of said elements to determine whether any of said elements are dissimilar by more than said reference from the others of said elements, combining some of said elements that are within said reference of each other, to produce a replacement value and outputting said replacement value of some of said elements that are within said reference of each other in place of one of said elements that is dissimilar by more than said reference of the others of said elements, this process increasing the apparent signal to noise ratio of the video signal.

41. A method for reducing noise on a video signal comprising the steps of selecting a first and neighboring elements from the signal, setting a threshold, comparing the levels of said neighboring elements to the level of said first element to determine whether the level of all of said neighboring elements are dissimilar by more than said threshold from said first element, and if all of said neighboring elements are dissimilar by more than said threshold from said first element then combining said neighboring elements and outputting said combination of said neighboring elements in place of said first element, this process increasing the apparent signal to noise ratio of the video signal.

42. The method of preserving detail in a noise reduced video signal wherein noise reduction is performed by combining a group of three or more pixels and substituting said combination for one pixel of said group, including the step of comparing two or more pixels of said group to determine the difference thereof, comparing said difference to a reference to determine the larger thereof, and inhibiting said substitution when said difference exceeds said reference.

43. The method of preserving detail in a noise reduced video signal which is the chroma subcarrier portion of an NTSC television video signal wherein noise reduction is performed by combining a first element and two neighboring elements of the input NTSC television video signal, said combination being the noise reduced value substituted for said first element, including the step of comparing two of said elements which are normally combined to determine if they are similar within a threshold value of each other, the step allowing said substitution to be made if said compared elements are similar within said threshold and inhibiting said substitution if said compared elements are not similar within said threshold thereby outputting said first element uncombined.

* * * * *